Oct. 8, 1935.  A. C. KORTE  2,016,927

METHOD OF MAKING VEHICLE WHEELS

Original Filed Sept. 16, 1932  6 Sheets-Sheet 1

ALFRED C. KORTE
INVENTOR

BY George R. Ericson
ATTORNEY

Oct. 8, 1935.                A. C. KORTE                2,016,927
METHOD OF MAKING VEHICLE WHEELS
Original Filed Sept. 16, 1932    6 Sheets-Sheet 2

ALFRED C. KORTE
*INVENTOR*

BY *George R. Ericson*
*ATTORNEY*

Oct. 8, 1935.  A. C. KORTE  2,016,927
METHOD OF MAKING VEHICLE WHEELS
Original Filed Sept. 16, 1932    6 Sheets-Sheet 4

ALFRED C. KORTE
INVENTOR

BY *George R. Ericson*
ATTORNEY

Oct. 8, 1935.  A. C. KORTE  2,016,927
METHOD OF MAKING VEHICLE WHEELS
Original Filed Sept. 16, 1932  6 Sheets-Sheet 5

ALFRED C. KORTE
*INVENTOR*

BY *George R. Ericson*
*ATTORNEY*

Oct. 8, 1935.  A. C. KORTE  2,016,927

METHOD OF MAKING VEHICLE WHEELS

Original Filed Sept. 16, 1932  6 Sheets-Sheet 6

ALFRED C. KORTE
INVENTOR

BY *George R. Ericson*
ATTORNEY

Patented Oct. 8, 1935

2,016,927

UNITED STATES PATENT OFFICE 2,016,927

METHOD OF MAKING VEHICLE WHEELS

Alfred C. Korte, St. Louis, Mo., assignor to Metalcraft Corporation, St. Louis, Mo., a corporation of Missouri Original application September 16, 1932, Serial No. 633,438. Divided and this application January 2, 1934, Serial No. 704,945

4 Claims. (Cl. 29—159)

This invention relates to rubber tired wheels for toy vehicles and includes a new and improved method for assembling the wheels and tires of my invention. This case is a division of my copending application Serial No. 633,438, filed September 16th, 1932. Rubber tires of this character have ordinarily been assembled to the wheels by one of two methods. By one of these methods the tires are molded to form and the wheel is provided with a shallow rim. The tire is pressed over the edge of the rim and expected to shrink into place to fit the smaller inside diameter of the rim by its own resiliency. This method is very unsatisfactory because the low grade rubber which is used in making such tires does not have sufficient resiliency to shrink it tightly onto the rim with the result that crooked treads, loose tires and other difficulties have been encountered, including the tires dropping off the rims entirely. This method is somewhat unsatisfactory because a very shallow rim must be used and also on account of the fact that molded tires are much more expensive than tires made from a single rubber strip, which may be extruded instead of molded individually.

The other method in general use prior to this invention is to form the tire as an extruded rubber strip with a longitudinal opening thru it, passing a wire thru the opening and welding the wires together after assembly of the tire to the rim. This method is, in the first place, very expensive and it has the obvious disadvantage of requiring the use of a substantial amount of additional material, including the rubber below the wire, that is to say between the wire and the rim, and the wires themselves are, of course, additional material. The method is also unsatisfactory inasmuch as considerable time is required to squeeze the rubber away from the joint on the wire so that the welding operation can be accomplished and then to force the rubber back into place so that the ends will contact with each other. In some cases the very cheapest tires have been made from strip material and provided with a clip or lacing to attach the ends together. This construction invariably results in a weak point at the joint and uneven wear to such an extent that the life of the tire is very short.

It is an object of this invention to provide a new and improved method of construction, painting and assembling wheels and tires according to my invention.

Figure 7:
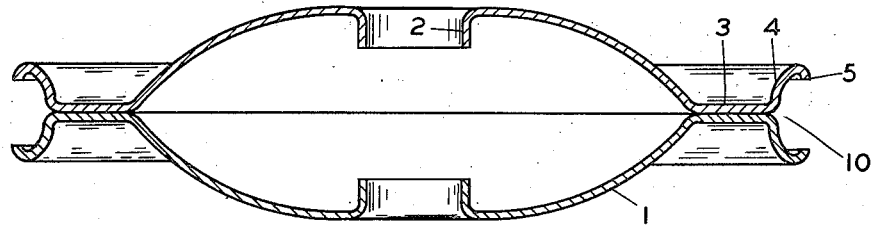
Figure 7 is a cross-sectional view of a wheel according to my invention before assembly of the tire thereto.

The reference numeral 1 indicates the wheel constructed of two sheet metal discs having dished central portions with hub openings 2 at each side and being joined together near their peripheries in the web portion 3. This joining may be done by spot-welding or any other suitable means. The rim of the wheel is formed in the outer portions of the two discs, each comprising an outwardly turned portion 4 and a reentrant portion 5 as indicated in Figure 7. When the wheel is originally formed the rim portions 4 and 5 are bent outwardly away from the center of the wheel to such an extent that the tire 6 may readily be inserted without deformation of the rubber or bending of the rim.

The tire comprises an extruded rubber strip 6 having a tread portion 7, a pair of oppositely located grooves 8 and the clinching portion 9 which is adapted to lie inside the rim and serves to hold the tire in place.

In view of the fact that these wheels are chiefly designed for use in toy vehicles, the painting is preferably accomplished by a dipping operation which is comparatively inexpensive. It is, of course, undesirable to paint the tire and for that reason the wheel is dipped while it is in the form shown in Figure 7, after the paint is dry, the strip which is used to make the tire is cut to proper length, placed in position with respect to the rim so that the reentrant portion 5 will lie adjacent the grooves 8, and the rim is then pressed together to bring the flanges 5 firmly into engagement with the grooves 8.

It will be noted that as the sides of the rim close together the diameter of the rim and particularly of the reentrant portion 5 will not remain the same, but each individual element of the rim will move in a path which may be considered as an arc of a circle about the point indicated at 10 in Figure 7. This results in an expansion of the diameter of the reentrant portion 5 which forms the periphery of the wheel. The greater part of this expanding action takes place after the portions 5 have entered the grooves 8, with the result that the tire itself is caused to expand in diameter along with the inturned flanges 5 on the rim. Such expansion of the diameter of the tire would cause a separation of the ends at the joint thereof, unless the tire was already compressed as to length. For the above reason it is necessary to provide means for compressing the tire in this manner before application of pressure to the edges of the rim to close them together and bring them into contact with the grooves 8. The following is a description of the construction and operation of an assembling die which I have devised for the purpose of properly assembling the wheels and tires according to my invention.

The reference numeral 11 indicates a frame of a conventional punch press, having a bolster plate 12 and a ram or slide 13. A bottom die shoe 14 is attached to the bolster plate by the usual conventional means (not shown) and a top shoe 15 is attached to the ram. The bottom shoe is provided with slide rails 16 by means of which the die proper may be slid into position to be operated on or withdrawn for purposes of refilling.

The lower part of the die comprises a sliding base plate 17 having a pilot pin 18 in the center thereof to engage the hub 2 of the wheels to hold the same in position on the die. It may be noted here that the rails 16 are beveled to prevent the plate 17 from lifting out of the bottom shoe and additional rails 67 may be provided to keep it from falling thru between rails 16 when it is in withdrawn position. A slidably mounted inner pressure ring 19 is provided for engagement with the lower part of the web 3 of the wheel and an outer pressure ring 20 is slidably mounted in the base plate in substantially the same manner as the ring 19.

Figure 5:
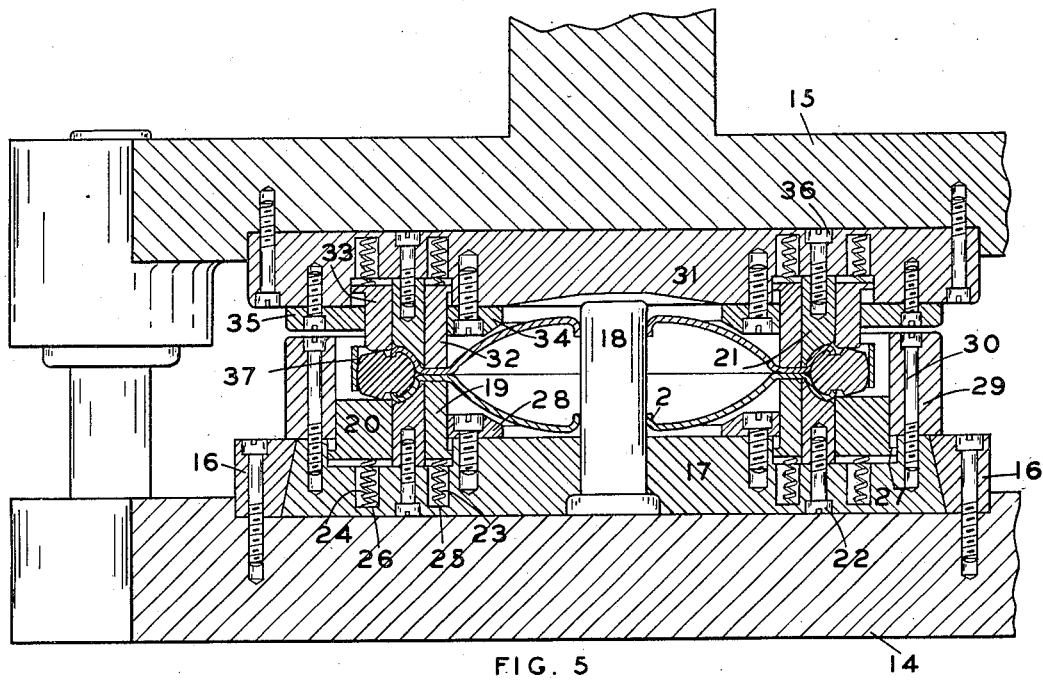
Figure 5 is a cross sectional view of the punch and die mechanism with a wheel and tire in place.
Figure 6:
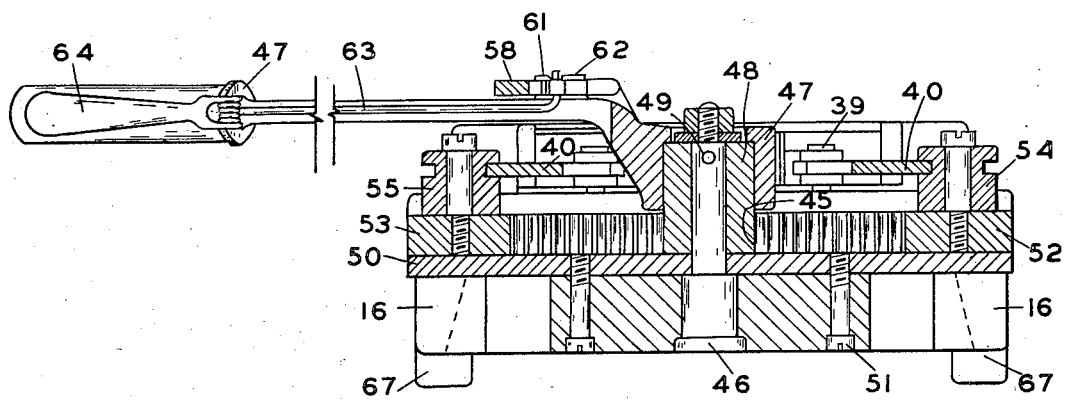
Figure 6 is a cross-sectional view taken along the line 6—6 on Figure 1 looking in the direction of the arrows.

The working part of the die is the ring 21 which is attached to the plate 17 by means of screws 22, as will be seen from Figure 5. The diameter of the ring 21 is such as to cause it to contact with the rim portion 4 of the wheels to which the tires are to be applied. The rings 19 are of proper diameter to contact with the web 3 and the rings 20 are of suitable diameter to support the tire and hold it in position, ready for assembly.

The rings 19 and 20 are yieldably held in upward position by a number of springs 23 and 24 respectively, which are mounted in holes 25 and 26, drilled in the base plate 17 as indicated in Figure 5. The rings 19 and 20 are provided with shoulders 27 which are adapted to engage with suitable stops to prevent the disassembly of these rings from the plate 17 by means of the springs 25 and 26. The stop for the inner ring 19 is in the form of ring 28 and the stop for the outer ring 20 is in the form of the ring 29. Rings 28 and 29 are attached by any suitable means to the plate 17 as for instance by the screws 30.

The upper part of the die or what is usually known as the punch comprises the plate 31 which is provided with pressure rings 32 and 33 corresponding to the rings 19 and 20 of the lower die. Stop rings 34 and 35 corresponding to rings 28 and 29 are also provided. The punch or working part of the upper die is attached to the plate 31 by means of suitable screws 36 and is identical with the member 21 except that it is inverted.

Figure 1:
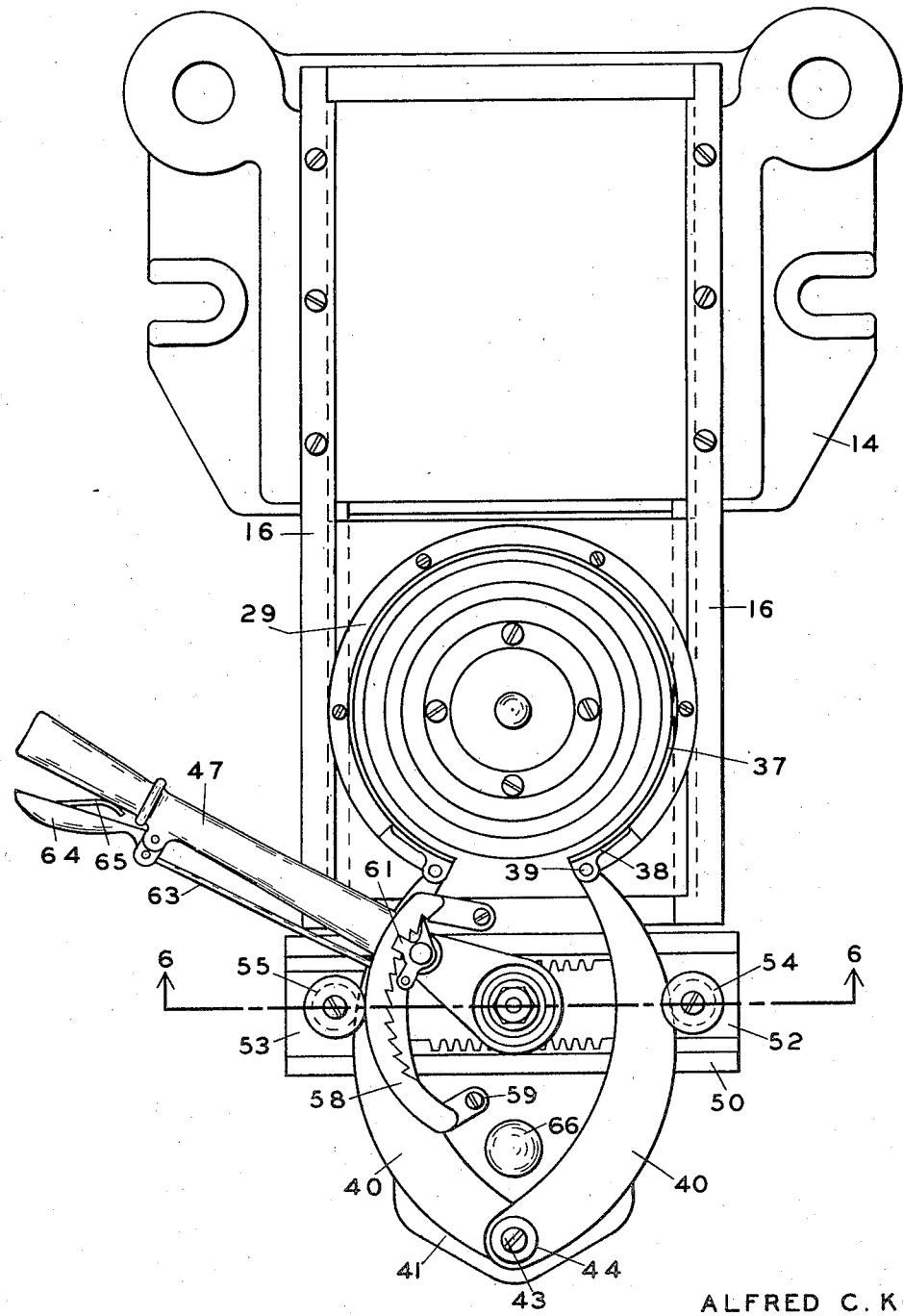
Figure 1 shows a plan view of the assembly die for assembling the wheels and tires of my invention.
Figure 2:
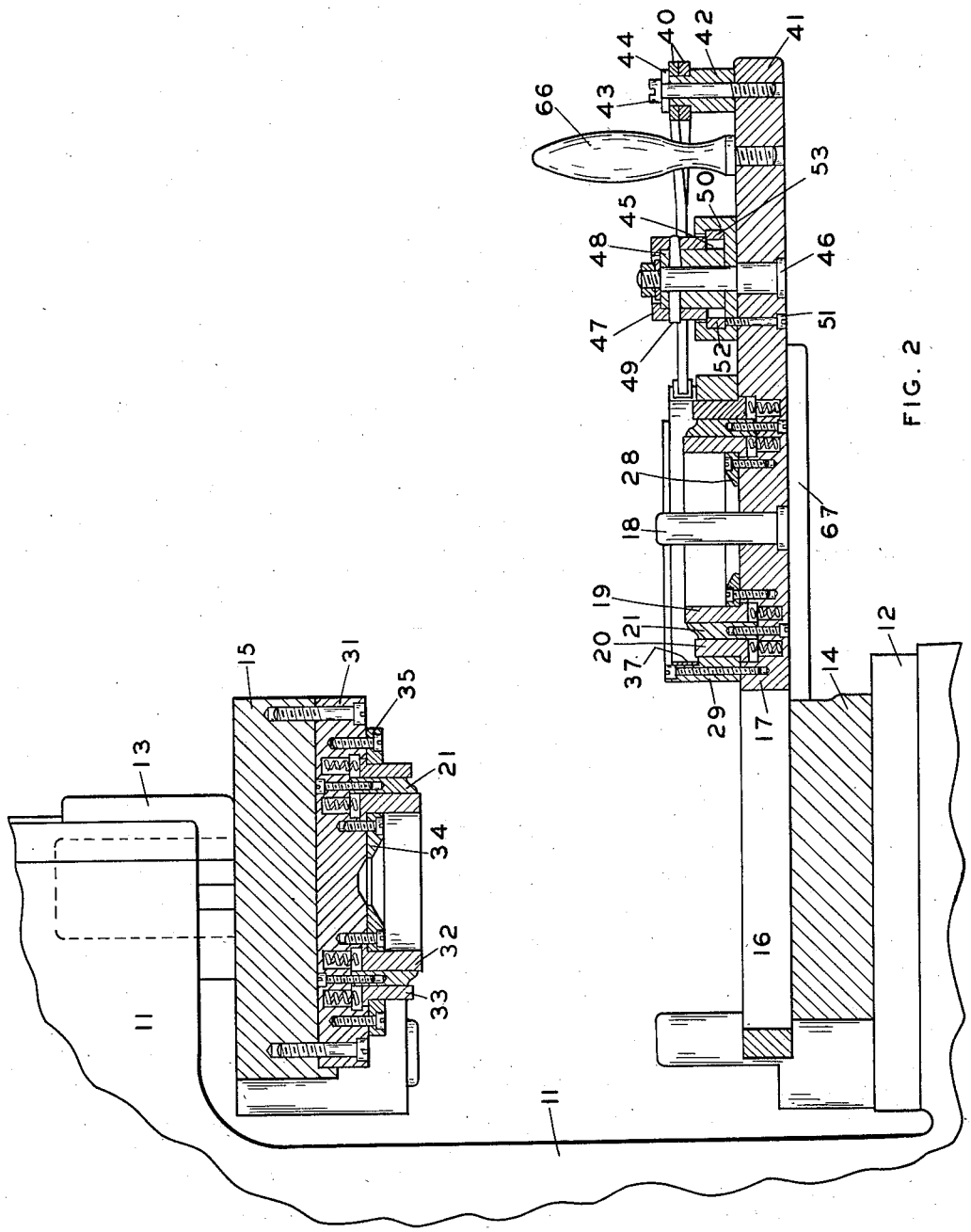
Figure 2 is a longitudinal sectional view of the punch and die which constitutes the assembling mechanism according to my invention, the die being shown in the withdrawn or refilling position.

The device for compressing the tire prior to the attachment of the rim thereto, is a compression band 37 which is operated by suitable mechanism which will now be described. The band is provided with suitable lugs 38 at its end and the lugs are provided with pins 39 which form a pivotal connection with the lever 40. The plate 17 is provided with an extension 41 and in the outer ends of this extension, a bushing 42 is secured by bolt 43 and washer 44, and the levers 40 are pivoted at their outer ends on bushings 42 as indicated in Figure 2.

Figure 3:
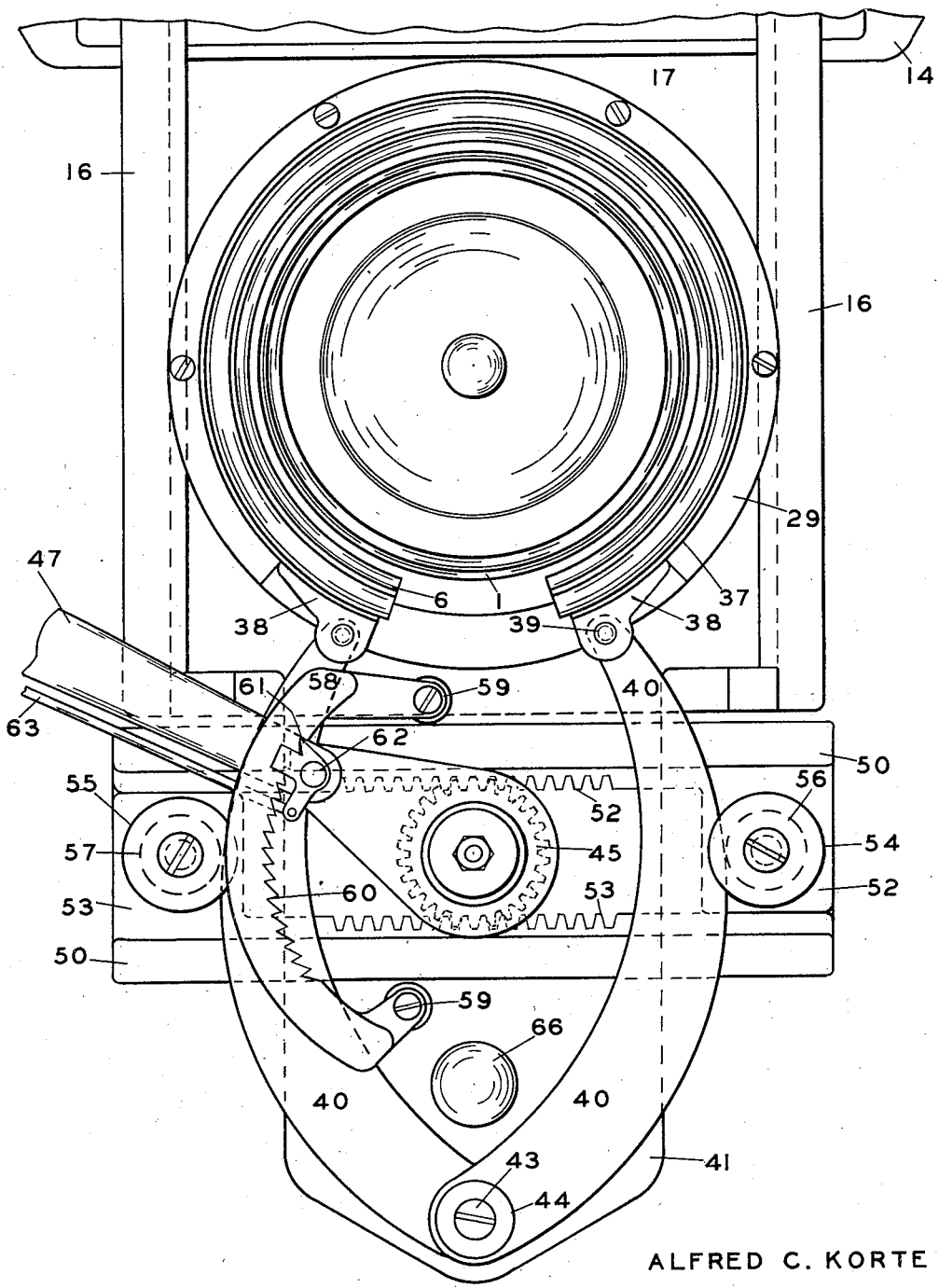
Figure 3 shows a plan view of the assembly die shown in Figure 1, except that Figure 3 is on a larger scale and shows a wheel and tire in position ready to be assembled.

As will be noted from Figure 3, the diameter of the compression band 37 is such that it may readily expand to a position large enough to receive the rubber strip 6 which is to form the tire without causing it to contact with the wheel. As will be seen from Figure 4 the band 37 may be drawn up to a position in which it will press the tire 6 tightly into contact with the rim of the wheel.

A pinion 45 is mounted on the plate 41 by means of bolt 46. A hand lever 47 for operating the pinion 45 is mounted on the hub 48 of the pinion and held in position by means of pin 49. A slide member 50 is mounted transversely with respect to the extension 41 of the plate 17 and held in position by any suitable means such as screws 51.

A pair of sliding racks 52 and 53 are mounted in the slide 50 and provided with rollers 54 and 55 respectively. These rollers are grooved as indicated by the dotted lines 56 and 57 in Figure 3 and the outer edges of the levers 40 are adapted to operate in the groove. The resiliency of the compression band 37 which is preferably formed of sheet metal, may be relied upon to hold the levers 40 in contact with the rollers 54 and 55, but if this is found not to be sufficient, additional spring means may, of course, be provided.

It will be noted that the racks 52 and 53 engage the pinion 45 in such a manner that by rotating the pinion the racks may be moved outwardly or inwardly as desired and the band 37 will be correspondingly expanded or contracted.

In order to hold the band 37 in contracted position a bracket 58 is provided and suitably attached to the plate 17 by means of the screws 59. Conventional ratchet teeth 60 are formed on the bracket 58 and the pawl 61 is pivotally mounted on the hand lever by means of pivot 62. The pawl is operated by a pull rod 63 which in turn is controlled by the conventional operating lever 64. A spring 65 of conventional construction is attached to the handle 64 for normally holding the pawl in engagement with the ratchet teeth.

Figure 8:
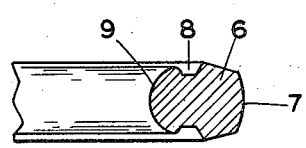
Figure 8 is a fragmentary view of the tire showing the cross section of the strip of rubber which is used to make the same.
Figure 9:
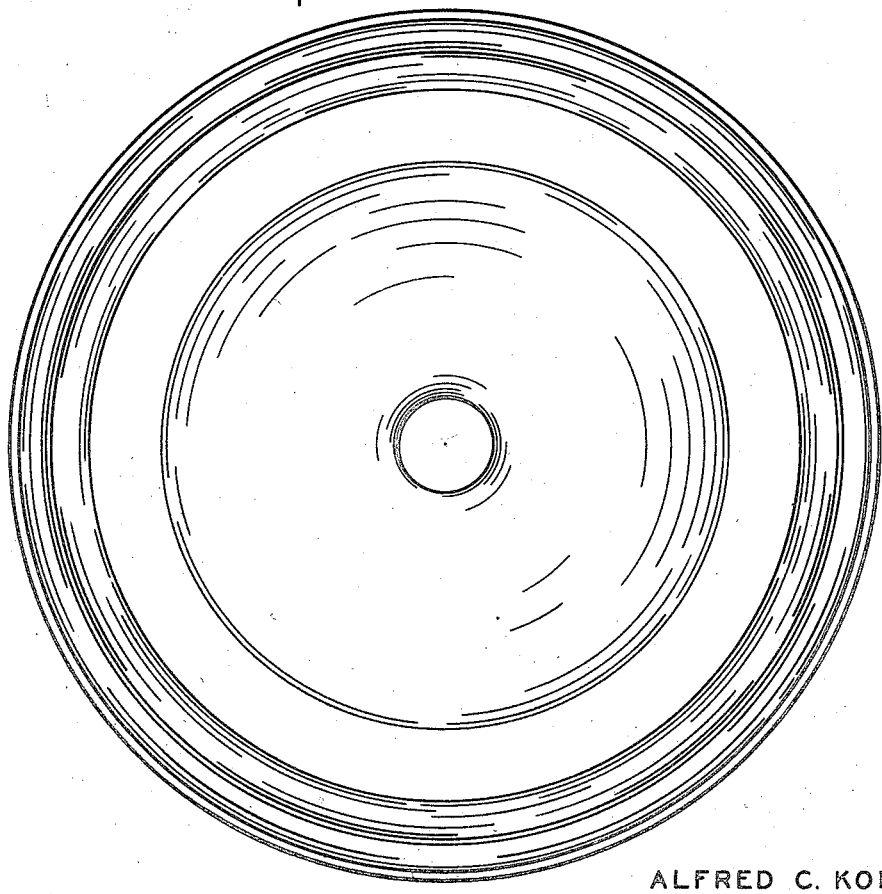
Figure 9 is a plan view of an assembled wheel and tire according to my invention.

In operation, the wheels are formed as shown in Figure 7 and painted. The rubber strips which are to form the tires are then extruded to the form shown in Figure 8 and cut to the proper length to form the tire. The assembling die being placed in position on the punch press, the lower part of the die proper is withdrawn to the position shown in Figure 2 by means of the handle 66 which is provided for that purpose.

The band 37 is opened by means of the operating handle 47, the wheel is dropped into place on the pilot pin 18 and the tire is laid in position as shown in Figure 3. The handle 47 is then pulled back to the position indicated in Figure 4 thereby compressing and reducing the diameter of the tire and pressing the butt ends firmly together as indicated in that figure.

Figure 4:
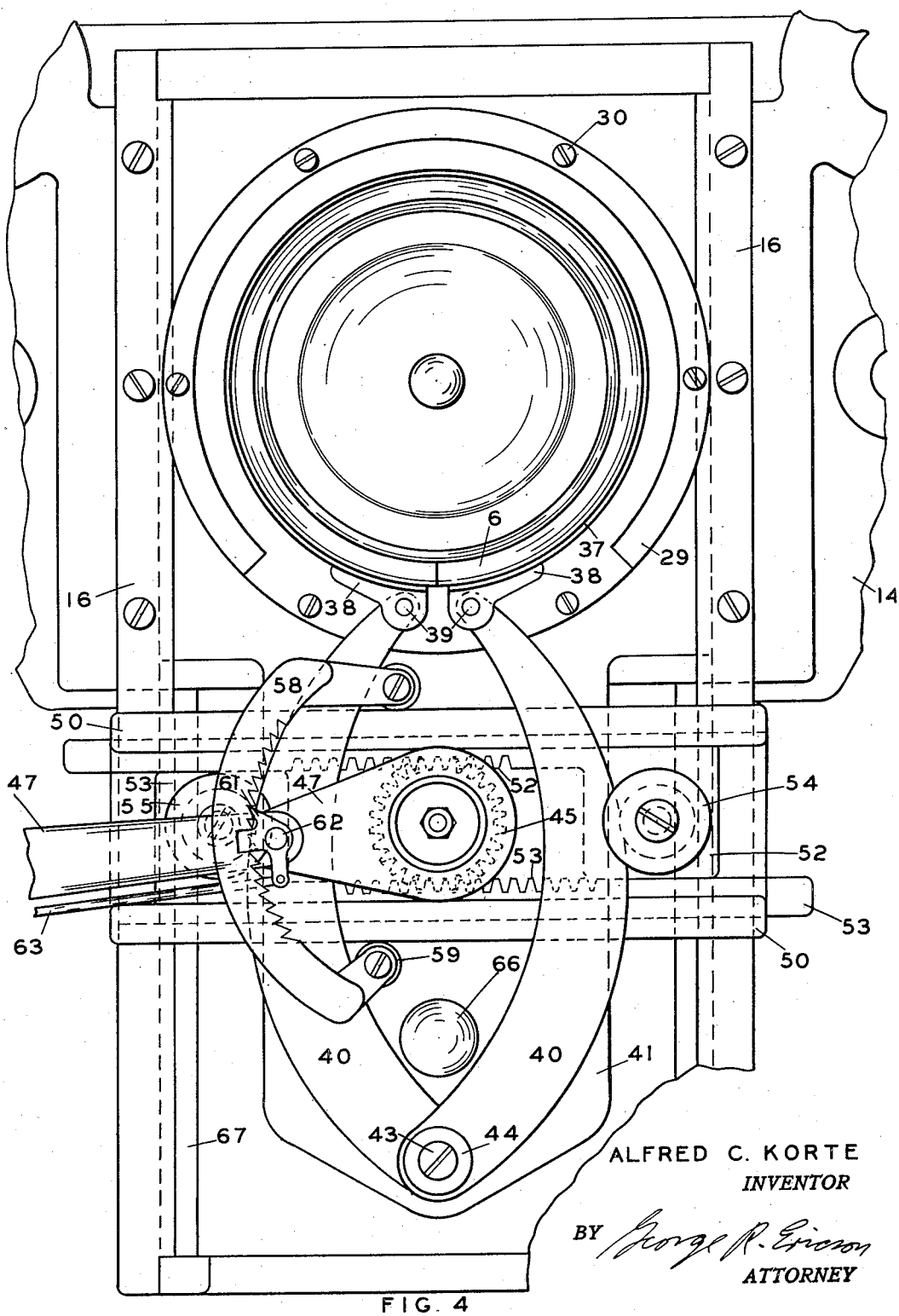
Figure 4 shows the same part as shown in Figure 3 with the assembling device closed as to hold the tire firmly in position on the wheel.

It may be noted here that the length of the band 37 is such as to cause a very substantial amount of compression of the tire when the mechanism is in the position shown in Figure 4 so that after expansion of the rim the normal resiliency of the rubber will be more than sufficient to bring the ends of the rubber strip which forms the tire firmly in contact with each other at the joint.

Figure 10:
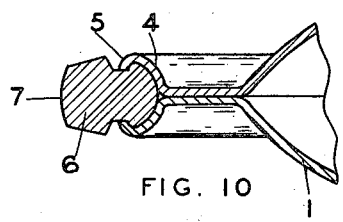
Figure 10 is a fragmentary sectional view showing the tire assembled to a portion of the rim of a wheel.

After the wheel and tire have been laid in the die in the position shown in Figure 3 and the handle 47 pulled back to compress the tire into contact with the wheel, the die is then pushed back under the ram 13 by means of the handle 66 into the operating position shown in Figure 4. The punch machine is then operated, bringing the upper part of the die down as indicated in Figure 5 and the upper and lower members 21 forcibly compress the edges of the rim toward each other so that they are held in firm engagement with the grooves 8 of the tire as indicated in Figure 10.

By carefully polishing the working edges of the members 21 I have found that the enamel or other paint which has been applied to the wheel is not seriously scarred or otherwise injured by the pressing operation.

Careful and extensive tests with tires made according to this invention show that such tires have much greater resiliency and durability and much longer life than tires made according to previous practice, also the tread is positively aligned with respect to the rim so that an unusually neat appearance for this type of wheel is presented.

I claim:

1. The method of forming a rubber tired wheel for toy vehicles which comprises forming disks having rim portions adapted to form a peripheral groove when two disks are secured together, welding said disks together, dipping the said welded disks into a suitable coating liquid forming a rubber strip with parallel grooves along opposite sides and adjacent one edge, inserting said strip in the said first named groove and bringing its ends together, and pressing the edges of the said disks into the grooves in the said strip to provide a resilient tire for the wheel.

2. The method of forming a rubber tired wheel for toy vehicles which comprises forming disks having rim portions adapted to form a peripheral groove when said disks are placed together, welding said disks together, dipping the welded disks into a suitable coating liquid forming a resilient strip with parallel grooves along opposite sides and adjacent one edge, positioning said strip in said first named groove and bringing its ends together, applying polished surfaces to the edges of said disks to force the edges of the disks into the grooves in the said strip to provide a resilient tire for the said wheel without injuring the coating on the wheel.

3. The method of forming a rubber tired wheel for toy vehicles which comprises forming wheel halves each having an annular channel adjacent the rim portion, bringing said halves together and welding them together so as to provide an annular groove at the periphery, dipping the said welded disks into a suitable coating liquid forming a rubber strip with parallel grooves along opposite sides and adjacent the edge, placing said strip in the said annular groove and bringing its ends together, applying polished pressing dies to the edges of said rim portions to press these edges into the grooves in the said strip.

4. The method of forming a rubber tired wheel for toy vehicles which comprises forming disks having rimmed portions adapted to form a peripheral groove when two disks are secured together, welding said disks together, coating the said welded disks with a suitable coating liquid forming a rubber strip with parallel grooves along opposite sides and adjacent one edge, inserting said strip in the said first named groove and bringing its ends together, and pressing the edges of the said disks into the grooves in the said strip to provide a resilient tire for the wheel.

ALFRED C. KORTE.